United States Patent
Roongta et al.

(10) Patent No.: US 11,126,637 B2
(45) Date of Patent: Sep. 21, 2021

(54) SYSTEM FOR DYNAMIC CONVERSION OF PARTY OBJECTS

(71) Applicant: BANK OF AMERICA CORPORATION, Charlotte, NC (US)

(72) Inventors: Ashwin Roongta, East Brunswick, NJ (US); Sayan Banerjee, Morganville, NJ (US); Anuj Paresh Shah, Jersey City, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 65 days.

(21) Appl. No.: 16/560,557

(22) Filed: Sep. 4, 2019

(65) Prior Publication Data

US 2021/0064632 A1 Mar. 4, 2021

(51) Int. Cl.
G06F 16/00 (2019.01)
G06F 16/25 (2019.01)
G06F 16/22 (2019.01)

(52) U.S. Cl.
CPC ............ G06F 16/258 (2019.01); G06F 16/22 (2019.01)

(58) Field of Classification Search
None
See application file for complete search history.

(56) References Cited

U.S. PATENT DOCUMENTS

| | | | | |
|---|---|---|---|---|
| 7,636,665 B2* | 12/2009 | Cooperstone | ...... | G06Q 10/1057 705/1.1 |
| 10,481,947 B2* | 11/2019 | Hwang | ................ | G06F 9/542 |
| 2003/0115080 A1* | 6/2003 | Kasravi | ................ | G06Q 10/087 715/254 |
| 2003/0120477 A1* | 6/2003 | Kruk | ................ | G06Q 10/06395 704/2 |
| 2003/0120504 A1* | 6/2003 | Kruk | .................. | G06Q 30/0605 705/26.2 |
| 2003/0120528 A1* | 6/2003 | Kruk | ...................... | G06Q 10/063 705/7.37 |
| 2003/0130878 A1* | 7/2003 | Kruk | ...................... | G06Q 10/10 705/7.22 |
| 2006/0020530 A1* | 1/2006 | Hsu | ........................ | G06Q 40/06 705/35 |
| 2011/0302083 A1* | 12/2011 | Bhinder | .................. | G06Q 20/32 705/44 |
| 2013/0151655 A1* | 6/2013 | Wu | .................... | H04N 21/2543 709/217 |
| 2014/0365369 A1* | 12/2014 | Understein | .......... | G06Q 20/405 705/44 |

(Continued)

*Primary Examiner* — Farhan M Syed

(74) *Attorney, Agent, or Firm* — Michael A. Springs; Moore & Van Allen PLLC; James C. Edwards

(57) ABSTRACT

A system for dynamic and automated conversion of party objects based on a change in party type and/or party classification. Party-type and/or party-classification specific rules are relied on to determine which data and processes to include in the converted party object. As such, the converted party object provides for (i) retaining data and processes that are common to both party types and/or classifications, (ii) disabling or otherwise deleting data and processes not associated with the new party type and/or classification, and (iii) adding new data, data entry fields and processes for data and processes associated with the new party type and/or classification that were not associated with the previous party type.

15 Claims, 3 Drawing Sheets

(56) References Cited

U.S. PATENT DOCUMENTS

2015/0220490 A1* 8/2015 Barber ................ G06F 40/143
715/234
2015/0379627 A1* 12/2015 Satija ................ G06Q 40/00
705/35
2018/0253418 A1* 9/2018 Hwang ................ G06F 9/542

* cited by examiner

SYSTEM FOR DYNAMIC CONVERSION OF PARTY OBJECTS

FIELD OF THE INVENTION

The present invention is generally related to data management and, more specifically, dynamic automated conversion of party objects based on party type and/or party classification/category.

BACKGROUND

In the course of events a party may change status, such as party type and/or party classification/category. When a party changes status, the existing party object (i.e., the file containing data points associated with the party) becomes obsolete, since certain data and/or processes in the existing party object may no longer be applicable to the new party type and/or classification and the new party type and/or classification may warrant additional data and/or processes.

Typically, when a party changes party type and/or party classification the existing party object is deleted, and a new party object is created. This is an efficient process, in that, redundant data acquisition and/or processing occurs, since data and processes may be common to both the existing party object and the new party type and/or classification.

Therefore, a need exists to develop systems, methods and the like that eliminate the need to generate a new party object when a change in party type and/or party classification/category occurs. As such the desired systems, methods and like should eliminate the need to perform redundant data acquisition and processes related to the generation of the party object. Moreover, since typically a change in party type and/or classification/category occurs while a party object is being completed (i.e., one or more processes are ongoing), a need exists to identify locations for start-up within ongoing processes.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like that provide for dynamic and automated conversion of party objects based on a change in party type and/or party classification/category. As a result of the present invention, when a party changes in type and/or classification there is no need to create a new party object and, thus, no need to perform redundant data acquisition and processes required for generating the party object.

According to specific embodiments of the invention, party-type and/or party-classification rules are relied on to determine which data and processes to include in the converted party object. As such, the converted party object provides for (i) retaining data and processes that are common to both party types and/or classifications, (ii) disabling or otherwise deleting data and processes not associated with the new party type and/or classification, and (iii) adding new data, data entry fields and processes for data and processes associated with the new party type and/or classification that were not associated with the previous party type. and/ classification. In addition the converted party object provides for identification of start-up points within common processes that were either not yet completed in the previous party object or require modification in the new party object.

In addition the conversion process is able to identify party relationships associated with the new party type and/or classification and provide for identification of the other related parties and, where applicable, links to the related parties objects or inclusion of data associated with the other related parties.

A system for dynamically converting a party object comprises first embodiments of the invention. The system includes a rules database configured to store a plurality of party object conversion rules, each of the party object rules applicable to one of a plurality of party types. The system additionally includes a computing platform including a memory and at least one processing device in communication with the memory. Further, the system includes a party object conversion application that is stored in the memory and executable by the at least one processing device. The application is configured to receive an input that triggers initiation of conversion of the party object from a first party type to a second party type, and, in response to receiving the input, access the rules database to retrieve, and apply to the party object, party object conversion rules applicable to the second party type. The application is further configured to, as a result of applying, to the party object, the party object conversion rules applicable to the second party type, convert the party object from the first party type to the second party type.

In specific embodiments of the system, the party object conversion application is further configured to determine, from the party object conversion rules applicable to the second party type, first data in the party object that is applicable to the second party type, and retain the first data in the party object. In other embodiments of the system, the party object conversion application is further configured to determine, from the party object conversion rules applicable to the second party type, second data in the data object that is not applicable to the second party type, and delete the second data from the party object. In still further embodiments of the system, the party object conversion application is further configured to determine, from the party object conversion rules applicable to the second party type, third data not in the data object that is applicable to the second party type, and add data entry fields in the data object for entry of the third data.

In other specific embodiments of the system, the party object conversion application is further configured to determine, from the party object conversion rules applicable to the second party type, one or more first processes applicable to the second party that are not linked in the party object, and link the one or more first processes to the party object. In other related embodiments of the system, the party object conversion application is further configured to determine, from the party object conversion rules applicable to the second party type, one or more second processes that are not applicable to the second party and are linked in the party object, and de-link and delete the one or more second processes from the party object.

In other specific embodiments of the system, the party object conversion application is further configured to determine, from the party object conversion rules applicable to the second party type, (i) one or more second processes applicable to the second party that are linked in the party object and are incomplete, and (ii) a start-off point for initiation completion of each of the one or more second processes, and configure the party object to initiate completion of each of the one or more second processes at the start-off point.

In still further specific embodiments the system includes a party relationship database configured to store a plurality of relationships between parties. In such embodiments of the system, the party object conversion application is further configured to determine, based on the party object conversion rules applicable to the second party type and accessing the party relationship database, one or more parties having a relationship with the party, and link party objects associated with the one or more parties to the party object.

Moreover, in further embodiments of the system, the rules database is further configured to store the plurality of party object conversion rules, each of the party object rules applicable a party type and a party classification within the party type. In such embodiments of the system, the party object conversion application is further configured to receive an input that triggers initiation of conversion of a party object from a first party classification to a second party classification, and in response to receiving the input, access the rules database to retrieve, and apply to the party object, party object conversion rules applicable to the second party classification. Further, the application is configured to, as a result of applying, to the party object, the party object conversion rules applicable to the second party classification, convert the party object from the first party classification to the second party classification. In further such embodiments of the system, the party object conversion application is further configured to receive an input that triggers initiation of conversion of a party object from at least one of a first party type and a first party classification to at least one of a second party type and a second party classification, and, in response to receiving the input, access the rules database to retrieve, and apply to the party object, party object conversion rules applicable to at least one of the second party type and the second party classification. The application being further configured to, as a result of applying, to the party object, the party object conversion rules applicable to at least one of the second party type and the second party classification, convert the party object from at least one of the first party type and the first party classification to at least one of the second party type and the second party classification.

A computer-implemented method for dynamic conversion of a party object defines second embodiments of the invention. The method is implemented by one or more processing devices and includes receiving an input that triggers initiation of conversion of the party object from a first party type to a second party type and, in response to receiving the input, accessing a rules database to retrieve, and apply to the party object, party object conversion rules applicable to the second party type. The method further includes, as a result of applying, to the party object, the party object conversion rules applicable to the second party type, converting the party object from the first party type to the second party type.

In specific embodiments of the method, accessing and/or converting further comprise determining, from the party object conversion rules applicable to the second party type, at least one of (i) first data in the party object that is applicable to the second party type, (ii) second data in the data object that is not applicable to the second party type, and (iii) third data not in the data object that is applicable to the second party type. In addition, the method further includes at least one of (a) retaining the first data in the party object, (b) deleting the second data from the party object, and (c) adding data entry fields in the data object for entry of the third data.

In other specific embodiments of the method, accessing and/or converting further comprises determining, from the party object conversion rules applicable to the second party type, at least one of (i) one or more first processes applicable to the second party that are not linked in the party object and (ii) one or more second processes that are not applicable to the second party and are linked in the party object. In addition, the method includes at least one of (a) linking the one or more first processes to the party object, and (b) de-linking and deleting the one or more second processes from the party object.

In still further specific embodiments of the method, accessing and/or converting further comprises determining, from the party object conversion rules applicable to the second party type, (i) one or more second processes applicable to the second party that are linked in the party object and are incomplete, and (ii) a start-off point for initiation completion of each of the one or more second processes. The method further includes configuring the party object to initiate completion of each of the one or more second processes at the start-off point.

Moreover, in other specific embodiments the method further includes determining, based on the party object conversion rules applicable to the second party type and accessing a party relationship database that stores a plurality of relationships between parties, one or more parties having a relationship with the party, and linking party objects associated with the one or more parties to the party object.

A computer program product including a non-transitory computer-readable medium defines third embodiments of the invention. The computer-readable medium includes a first set of codes for causing a computer to receive an input that triggers initiation of conversion of a party object from a first party type to a second party type. The computer-readable medium additionally includes a second set of codes for causing a computer to, in response to receiving the input, access the rules database to retrieve, and apply to the party object, party object conversion rules applicable to the second party type. In addition, the computer-readable medium includes a third set of codes for causing a computer to, as a result of applying, to the party object, the party object conversion rules applicable to the second party type, convert the party object from the first party type to the second party type.

In specific embodiments of the computer program product, the second set of codes is further configured to cause the computer to determine, from the party object conversion rules applicable to the second party type, at least one of (i) first data in the party object that is applicable to the second party type, (ii) second data in the data object that is not applicable to the second party type, and (iii) third data not in the data object that is applicable to the second party type. In such embodiments of the computer program product, the third set of codes is further configured to cause the computer to, at least one of (i) retain the first data in the party object, (ii) delete the second data from the party object, and (iii) add data entry fields in the data object for entry of the third data.

In still further specific embodiments of the computer program product, the second set of codes is further configured to cause the computer to determine, from the party object conversion rules applicable to the second party type, at least one of (i) one or more first processes applicable to the second party that are not linked in the party object and (ii) one or more second processes that are not applicable to the second party and are linked in the party object. In such embodiments of the computer program product, the third set of codes is further configured to, at least one of (i) link the one or more first processes to the party object, and (ii) de-link and delete the one or more second processes from the party object.

Thus, according to embodiments of the invention, which will be discussed in greater detail below, the present invention provides for dynamic and automated conversion of party objects based on a change in party type and/or party classification/category. Party-type and/or party-classification rules are relied on to determine which data and processes to include in the converted party object. As such, the converted party object provides for (i) retaining data and processes that are common to both party types and/or classifications, (ii) disabling or otherwise deleting data and processes not associated with the new party type and/or classification, and (iii) adding new data, data entry fields and processes for data and processes associated with the new party type and/or classification that were not associated with the previous party type.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
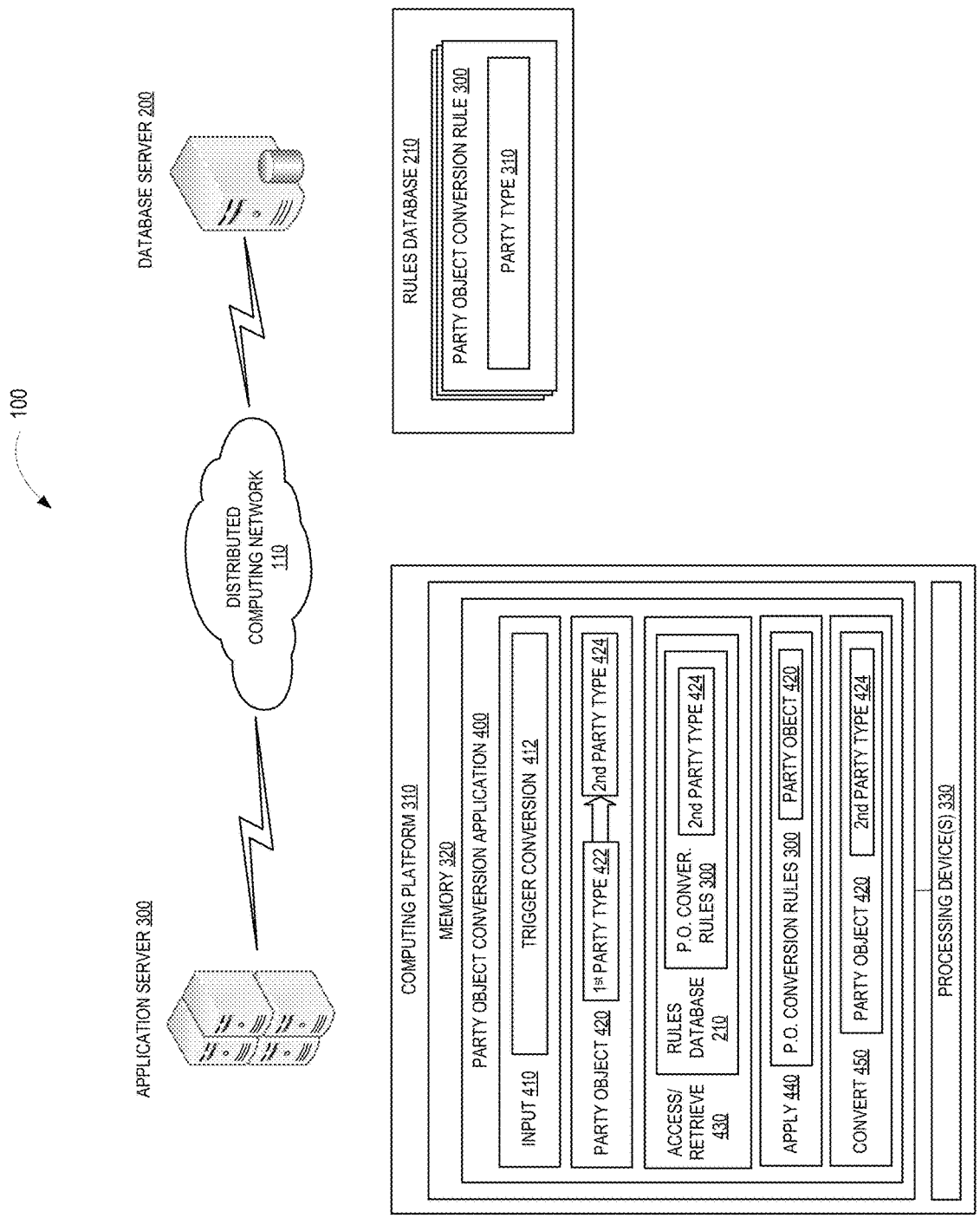
Figure 2:
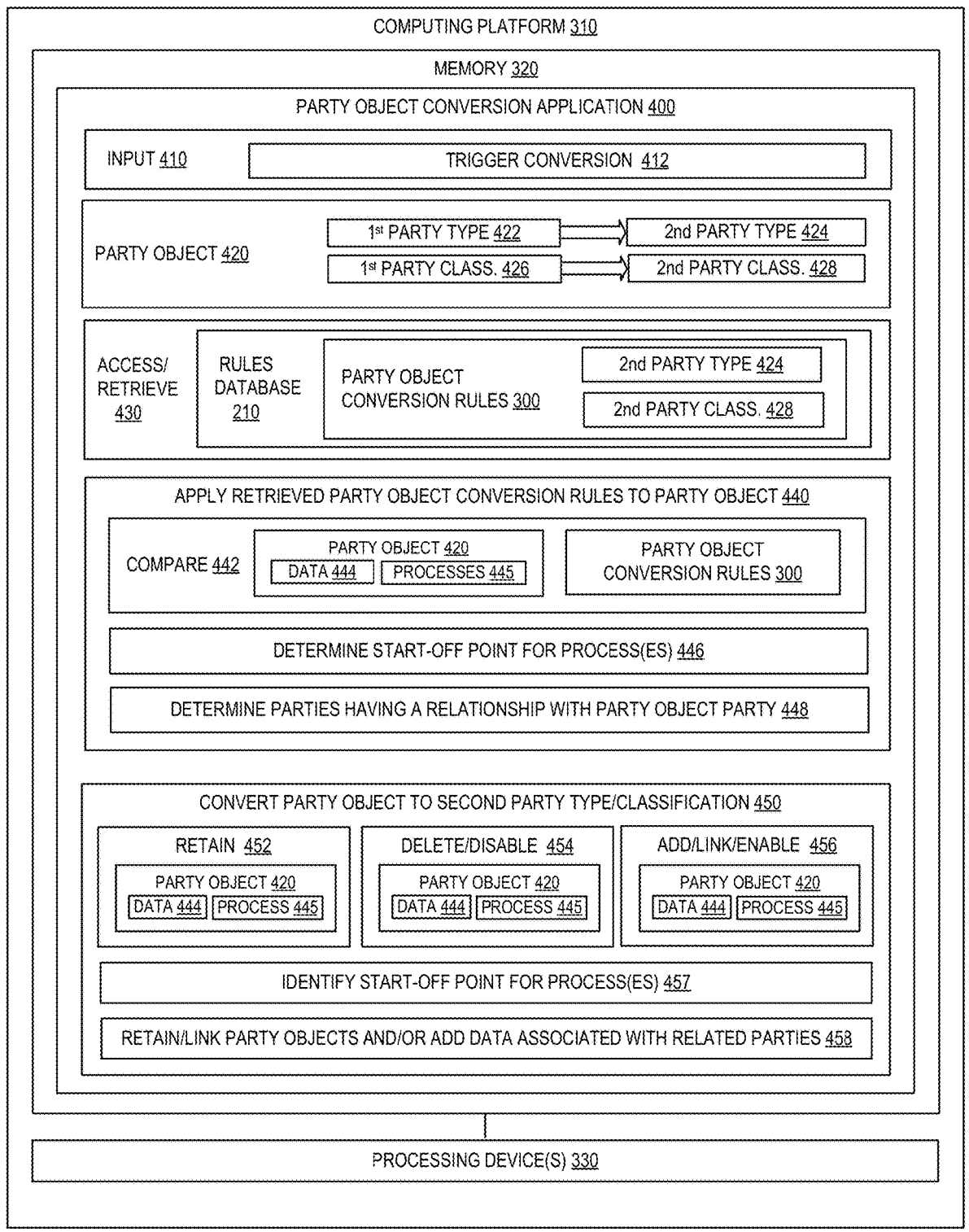
Figure 3:
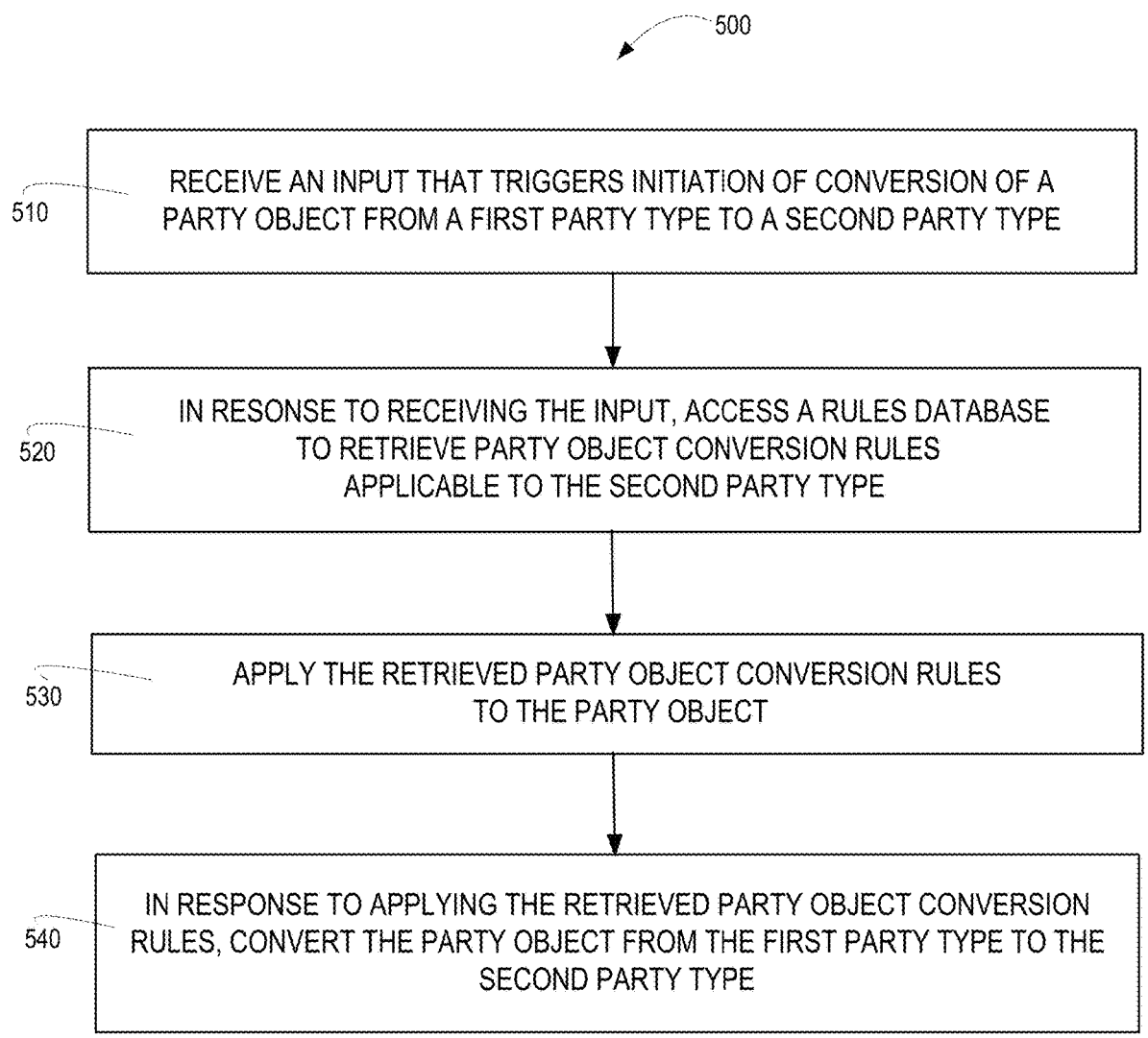

Having thus described embodiments of the disclosure in general terms, reference will now be made to the accompanying drawings, wherein:

FIG. 1 is a schematic diagram of a system for dynamically converting party objects, in accordance with some embodiments of the present disclosure;

FIG. 2 is a block diagram of a computing platform including a party object conversion application, in accordance with some embodiments of the present disclosure; and FIG. 3 is a flow diagram of a method for dynamic party object conversion, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for dynamic and automated conversion of party objects based on a change in party type and/or party classification/category. As previously discussed, when a party changes party type or classification, the corresponding party object (i.e., file containing data points associated with the party) must also be changed, since the data requirements and processes required for different party types and/or classifications differ. Heretofore, a change in party type or classification has warranted generation of an entirely new party object. However, the present invention, which converts the existing party object to comply with the change is party type and/or classification, circumvents the need to generate a new party object.

In specific embodiments of the invention in which the party is a client or non-client of a financial institution the party type may include, but is not limited to, an individual, or a non-individual, such as a trust, a corporation, a limited liability corporation (LLC), a partnership or the like. In addition, the party classification, otherwise referred to herein as category may further delineate a party type. For example, in specific embodiments of the invention, in which the party is a client or non-client of a financial institution, the party may be a trust and the classification may be the various roles associated with a trust, such as trustee, successor trustee, beneficiary, and the like. One of ordinary skill in the art will realize that while specific examples of embodiments are drawn to financial institutions, the dynamic conversion of party objects is applicable to any other entity that creates objects for parties, including, but not limited to, business entities, government entities and the like.

Thus, by providing for dynamic and automated conversion of party objects, the present invention eliminates the need to generate a new party object in the event that a party type and/or classification changes. As such, by converting the party object, as opposed to generating a new party object, the present invention is able to leverage all of the processing and data acquisition in the existing party object that is applicable to the converted party object. As a result, the present invention provides for greater efficiency in managing party objects and from a technical standpoint lessens the burden placed on the processing device (i.e., eliminates duplicative processing) and minimizes consumption of resource, such as memory or the like.

According to embodiments of the invention, party-type and/or party-classification specific rules are relied on to determine which data and processes to include in the converted party object. As such, the converted party object provides for (i) retaining data and processes that are common to both party types and/or classifications, (ii) disabling or otherwise deleting data and processes not associated with the new party type and/or classification, and (iii) adding new data, data entry fields and processes for data and processes associated with the new party type and/or classification that were not associated with the previous party type and/or classification (i.e., not included in the party object being converted).

In addition the converted party object provides for identification of start-up points within common processes that were either not yet completed in the previous party object or require modification in the new party object.

In addition the conversion process is able to identify party relationships associated with the new party type and/or classification and provide for identification of the other related parties and, where applicable, links to the related parties objects or inclusion of data associated with the other related parties. In this regard, child or parent party objects that are linked/related to both the existing/previous party type and/or classification and the new/converted party type and/or classification will remain intact in the converted party object. In addition, child or parent party objects that are linked/related to the existing/previous party type and/or classification but not linked/related to new/converted party type and/or classification are omitted/removed from the converted party object. Further, child or parent party objects that are linked/related to the new/converted party type and/or classification but not linked/related to the existing/previous party type and/or classification are added to the converted party object.

Turning now to the figures, FIG. 1 illustrates a system 100 for dynamically converting party objects, in accordance with embodiments of the present invention. A party object as used herein is a file that includes all of the acquired data points associated with as party. A party may be an individual or an entity. In specific embodiments of the invention, in which the party objects are associated with a financial institution the entities may be individual clients/customers (or non-clients/customers) and the entities may include, but are not limited to, corporations, LLC, trusts, partnerships and the like.

The system 100 is implemented in a distributed computing network 110, which may include the Internet, and/or one or more intranets or the like. The system includes a rules database 210 stored in a database server 200 or the like. The rules database 210 stores a plurality of party object conversion rules 300. Each of the party object conversion rules are applicable to one of a plurality of party types 310.

The system additionally includes a computing platform 310 comprising an application server 300 or the like. The computing platform 310 includes a memory 320 and at least one processing device 330 in communication with the memory 320. The memory 320 of computing platform 310 stores party object conversion application 400 that is executable by the processing device 330 and configured to convert a party object 420 from a first party type 422 to a second party type 424. For example, in the financial institution scenario, the first party type may be an individual and the second party type may be a corporation or vice versa.

Specifically, the party object conversion application 400 is configured to receive an input 410 that triggers conversion 412 of the party object 420 from the first party type 422 to the second party type 424. The input 410 may be received directly from a user interface associated with the application 400 (i.e., user input) or the input may be received from one of various internal or external systems of records (not shown in FIG. 1), which are configured to communicate the input to the application 400, in response to a change in party type. In specific embodiments of the invention, the application 400 may be configured to perform requisite actions to confirm the change in party type before proceeding with the party object conversion process.

In response to receiving input 410, the party object conversion application 400 is configured to access 430 rules database 210 to retrieve party object conversion rules 300 that are applicable to the second party type 424. In response to retrieving the party object conversion rules 300, the party object conversion application 400 is configured to apply/compare 440 the rules 300 to the party object to determine what changes are required in the existing party object 420. In this regard, the application 440 of the rules 300 to the party object 420 may include, but is not limited to, determining which data and/or processes are common to both the first 422 and second party types 424, determining which data and/or processes are applicable to the second party type 424 and not included in the existing party object 420 and determining which data and/or processes are included in the existing party object 420 and are not applicable to the second party type 424.

In response to applying the retrieved rules 300 to the party object 420, the party object conversion application 400 is configured to convert 450 the party object 420 to the second party type 424. The conversion 450 may include, but is not limited to, (i) retaining data and processes that are common to both the first party type 422 and the second party type 424, (ii) deleting data or processes (or disabling links associated with such data and processes) not applicable/required by the second party type 424, and (iii) adding data or processes (or enabling links associated with such data and processes) applicable/required by the second party type 424 that are not in the existing party object 420.

Referring to FIG. 2 a block diagram is presented of the computing platform 310 including the party object conversion application 400, in accordance with embodiments of the present invention. The computing platform 310 which may comprise one or more computing devices (e.g., servers, computing devices, or the like), is configured to execute algorithms, modules, routines, applications, such as party object conversion application 400. Computing platform 310 includes memory 320, which may comprise volatile and non-volatile memory, such as read-only and/or random-access memory (RAM and ROM), EPROM, EEPROM, flash cards, or any memory common to computing platforms). Moreover, memory 320 may comprise cloud storage, such as provided by a cloud storage service and/or a cloud connection service.

Further, computing platform 310 also includes at least one processing device 330, which may be an application-specific integrated circuit ("ASIC"), or other chipset, logic circuit, or other data processing device. Processing device(s) 330 may execute one or more application programming interface (APIs) (not shown in FIG. 2) that interface with any resident programs, such as party object conversion application 400 or the like, stored in the memory 320 of the computing platform 310 and any external programs. Processing devices(s) 330 may include various processing subsystems (not shown in FIG. 2) embodied in hardware, firmware, software, and combinations thereof, that enable the functionality of the computing platform 310 and the operability of the computing platform 310 on the distributed computing network 110 (shown in FIG. 1). For example, processing subsystems allow for initiating and maintaining communications and exchanging data with other networked devices. For the disclosed aspects, processing subsystems of processing device 330 may include any subsystem used in conjunction with party object conversion application 400 and related tools, routines, sub-routines, algorithms, sub-algorithms, sub-modules thereof.

Computing platform 310 may additionally include a communications module (not shown in FIG. 2) embodied in hardware, firmware, software, and combinations thereof, that enables electronic communications between the computing platform 310 and other network devices, such as rules database 200 (shown in FIG. 1) and a relationship database. Thus, communication module may include the requisite hardware, firmware, software and/or combinations thereof for establishing and maintaining a network communication connection with one or more network devices.

Memory 302 of computing platform 300 stores party object conversion application 400 that is configured to convert party objects based on a change in party status, in accordance with embodiments of the present invention. Specifically, the party object conversion application 400 is configured to receive an input 410 that triggers conversion 412 of the party object 420 from a first party status to a second party status, such as from the first party type 422 to the second party type 424 or a first party classification/category 426 to a second party classification/category 428. As previously discussed, the input 410 may be received directly from a user interface associated with the application 400 (i.e., user input) or the input may be received from one of various internal or external systems of records (not shown in FIG. 1), which are configured to communicate the input to the application 400, in response to a change in party type.

In specific embodiments of the invention, the conversion of the party object may not only be triggered by a change in party type, but also changes in party classification/category (i.e., a classification or category within specific type of party). Thus, any change in party "status" may result in a need to change the party object. For example, within the financial institution example, the party type may be a trust and the classification categories may be the various roles of trust participants, including, but not limited to, trustee, beneficiary, successor beneficiary and the like. If the trust participant changes roles or adds another role a change in the party object is required, since the data and processes required of such change. It should be noted that the classifications/categories within a party type are not static and can be defined dynamically as need dictates.

In response to receiving input 410, the party object conversion application 400 is configured to access 430 rules database 210 to retrieve party object conversion rules 300 that are applicable to the second party type 424 and/or the second party class classification. Intra party type changes (i.e., a change from a first party classification/category to a second party classification/category within the same party type) may or may not require rules associated with both the party type and the party classification/category. In other embodiments of the invention, the party status change may be from a first party type 422 to a specific party classification/category 428 within a second party type 426 and, therefore, rules associated with both the second party type 424 and the second party classification 428 may be applicable to the conversion.

In response to retrieving the applicable party object conversion rules 300, the party object conversion application 400 is configured to apply/compare 440 the retrieved rules 300 to the party object, specifically the data 444 and the processes 445, to determine what changes are required of the data 444 and the processes 445 in the existing party object 420. In this regard, the application 440 of the rules 300 to the party object 420 may include, but is not limited to, (i) determining which data and/or processes are common to both the first 422 and second party types 424 and/or first 426 and second classification/category 428, (ii) determining which data and/or processes are applicable to the second party type 424 and second classification/category 428 and not included in the existing party object 420, and (iii) determining which data and/or processes are included in the existing party object 420 and are not applicable to the second party type 424 and/or the second classification/category 428.

In additional embodiments of the invention, the party object rules 300 may be applied to the party object 420 to determine a start-off point 446 for processes. Process flows may change as a result of a change in party type and/or party classification. The present invention is able to determine what portions/steps of the process are common to both party types and/or party classifications/categories, such that a portion of the process applicable to both party types and/or party classifications/categories is retained in the converted party object. The start-off point (i.e., the step or point in the process at which further processing is required) marks the point/step in the process at which the process deviates from one party type to another and/or one classification/category to another. For example, requirements for data inputs/approvals for identity verification may vary depending upon the type of the party. The initial data inputs/approvals may be the same for the different party types while further data input/approval requirements may differ. The present invention is able to determine the point/step at which the two processes diverge, which serves as the start-off point for further processing once the conversion of the party object occurs.

In further specific embodiments of the invention, the party object rules 300 may be applied to the party object 420 to determine parties (448) having a relationship with the second party status (i.e., the second party type and/or the second party classification/category). In certain instances, the rules 300 may dictate that a party relationship is maintained and, thus links to the related party object and other information pertaining to the related party may be maintained in the party object or links provided to such information. In other instances, the rules 300 may dictate that a party relationship is not to be maintained and, thus links to the related party object and other information pertaining to the related party is deleted or disabled in the party object.

In other embodiments, the rules 300 may identify further categories of parties which may be related to the party in the party object. In such instances, the application 300 may communicate with a relationship database (not shown in FIG. 2) or the like to determine if the party in the party object has other related parties in the identified categories and, if so, add links to the party objects associated with the related parties and/or include information or links to information associated with the related parties.

In response to applying the retrieved rules 300 to the party object 420, the party object conversion application 400 is configured to convert 450 the party object 420 to the second party type 424. The conversion 450 may include, but is not limited to, (i) retaining 452 data 444 and processes 445 that are common to both the first party type 422 and the second party type 424, (ii) deleting 454 data 444 or processes 445 (or disabling links associated with such data and processes) not applicable/required by the second party type 424, and (iii) adding/enabling 456 data 444 or processes 445 (or enabling links associated with such data and processes) applicable/required by the second party type 424 that are not in the existing party object 420.

Additionally, conversion 450 may include identifying 457 the start-off point/step for initiating an inflow and/or modified process 445. In some embodiments of the invention, in addition to identifying the start-off point/step, the process may be automatically initiated at the identified start-off point/step without any manual intervention (e.g., approval notifications may be sent to requisite entities for identity authorization or account authorization).

In further specific embodiments of the invention, conversion 450 includes retaining/adding and/or disabling 458 party object links associated with related parties and/or adding information or links to information to the party object associated with the related parties.

Referring to FIG. 3 a flow diagram of a method 500 for dynamically converting a party object, in accordance with embodiments of the present invention. At Event 510, an input is received that triggers initiation of conversion of a party object from a first party type to a second party type and/or party classification/category. As previously discussed, the input may be received internally via a user-interface associated with a conversion application or the input may be received from other systems of record that receive change of party type/classification information. The party object is file that stores data points associated with a party. The party type may include, but is not limited to, an individual or a non-individual entity, such as a corporation, an LLC, a partnership, a trust or like. Party classification/category may be any attribute that delineates a party type, for example a role in a trust, specific attributes of the party, or the like.

At Event 520, in response to receiving the input, a rules database is accessed to retrieve party object conversion rules applicable to the second party type and/or party classification/category. At Event 530, the retrieved party object rules are applied to the party object to determine what changes are required of the data and the processes in the existing party object. Applying the party object conversion rules to the party object may include, but is not limited to, (i) determining which data and/or processes are common to both the first and second party types and/or the classification/category, (ii) determining which data and/or processes are applicable to the second party type and classification/category and not included in the existing party object, and (iii) determining which data and/or processes are included in the existing party object and are not applicable to the second party type and/or the classification/category. In additional embodiments of the method, In additional embodiments of the method, applying the party object conversion rules to the party object includes determining a start-off point for modified and/or in-flow processes. As dictated by the rules, process flows may require modification as a result of a change in party type and/or party classification. In specific embodiments, applying the rules to the party object includes determining what portions/steps of the process are common to both party types and/or party classifications/categories and defining the start-off point as the point/step in the process at which the process deviates from one party type to another and/or based on classification/category. In further specific embodiments of the method, the party object conversion rules to the party object includes determining parties having a relationship with the second party type and/or classification/category. In such embodiments, the rules may dictate what types of party relationships are applicable to a specific party type and a relationship database may be accessed to identify the related parties.

At Event 540, in response to applying the retrieved rules to the party object, the party object is converted from the first party type to the second party type. The conversion may include, but is not limited to, (i) retaining data and processes that are common to both the first party type and the second party type and/or party classification/category, (ii) deleting data or processes (or disabling links associated with such data and processes) not applicable/required by the second party type and/or party classification/category, and (iii) adding/enabling data or processes (or enabling links associated with such data and processes) applicable/required by the second party type and/or party classification/category that are not in the existing party object.

Additionally, conversion may include identifying the start-off point/step for initiating an inflow and/or modified process. In some embodiments of the method, in addition to identifying the start-off point/step, the method may include automatically initiating the process at the identified start-off point/step without any or minimal manual intervention. In further specific embodiments of the method, conversion includes retaining/adding and/or disabling party object links associated with determined or maintained related parties and/or maintaining, adding or deleting information or links to information to the party object associated with the related parties.

Thus, present embodiments of the invention provide for dynamic and automated conversion of party objects based on a change in party type and/or party classification/category. Party-type and/or party-classification rules are relied on to determine which data and processes to include in the converted party object. As such, the converted party object provides for (i) retaining data and processes that are common to both party types and/or classifications, (ii) disabling or otherwise deleting data and processes not associated with the new party type and/or classification, and (iii) adding new data, data entry fields and processes for data and processes associated with the new party type and/or classification that were not associated with the previous party type The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically converting a party object associated with a party, the system comprising:
    a rules database configured to store a plurality of party object conversion rules, each of the party object rules applicable to one of a plurality of party types, wherein the party types include an individual, a trust, a corporation, a limited liability corporation (LLC), and a partnership;
    a computing platform including a memory and at least one processing device in communication with the memory; and
    a party object conversion application stored in the memory, executable by the at least one processing device and configured to:
        receive an input that triggers initiation of conversion of the party object from a first party type to a second party type, wherein the party object is a file that comprises party-type specific data points associated with the party and processes required to completed by the party,
        in response to receiving the input, access the rules database to retrieve party object conversion rules applicable to the second party type,
        apply the retrieved party object conversion rules to the party object to determine, from the party object conversion rules, (i) first data in the party object that is applicable to the second party type, (ii) second data in the party object that is not applicable to second party type, and (iii) third data not in the data object that is applicable to the second party type, and
        in response to applying the retrieved party object conversion rules, convert the party object from the first party type to the second party type, wherein converting includes (i) retaining the first data in the party object, (ii) deleting the second data in the party object, and (iii) adding data entry fields in the data object, wherein the data entry fields are configured for entry of the third data.

2. The system of claim 1, wherein the party object conversion application is further configured to apply the retrieved party object conversion rules applicable to party object to:
    determine, from the party object conversion rules applicable to the second party type, one or more first processes applicable to the second party that are not linked in the party object, and
    link the one or more first processes to the party object.

3. The system of claim 1, wherein the party object conversion application is further configured to apply the retrieved party object conversion rules applicable to party object to:
    determine, from the party object conversion rules applicable to the second party type, one or more second processes that are not applicable to the second party and are linked in the party object, and
    de-link and delete the one or more second processes from the party object.

4. The system of claim 1, wherein the party object conversion application is further configured to apply the retrieved party object conversion rules applicable to party object to:
    determine, from the party object conversion rules applicable to the second party type, (i) one or more second processes applicable to the second party that are linked in the party object and are incomplete, and (ii) a start-off point for initiation completion of each of the one or more second processes, and
    configure the party object to initiate completion of each of the one or more second processes at the start-off point.

5. The system of claim 1, further comprising a party relationship database configured to store a plurality of relationships between parties, and
    wherein the party object conversion application is further configured to:
    determine, based on the party object conversion rules applicable to the second party type and accessing the party relationship database, one or more parties having a relationship with the party, and
    link party objects associated with the one or more parties to the party object.

6. The system of claim 1, wherein the rules database is further configured to store the plurality of party object conversion rules, each of the party object rules applicable a party type and a party classification within the party type.

7. The system of claim 6, wherein the party object conversion application is further configured to:
    receive an input that triggers initiation of conversion of a party object from a first party classification to a second party classification,
    in response to receiving the input, access the rules database to retrieve party object conversion rules applicable to the second party classification,
    apply the retrieved party object rules to the party object, and in response to applying the retrieved party object rules to the party object, convert the party object from the first party classification to the second party classification.

8. The system of claim 6, wherein the party object conversion application is further configured to:
receive an input that triggers initiation of conversion of a party object from at least one of a first party type and a first party classification to at least one of a second party type and a second party classification,
in response to receiving the input, access the rules database to retrieve party object conversion rules applicable to at least one of the second party type and the second party classification,
apply the retrieved party object conversion rules to the party object, and
in response to applying the retrieved party object conversion rules, convert the party object from at least one of the first party type and the first party classification to at least one of the second party type and the second party classification.

9. A computer-implemented method for dynamic conversion of a party object, the method implemented by one or more processing devices and including:
receiving an input that triggers initiation of conversion of the party object from a first party type to a second party type from amongst a plurality of party types, wherein the party object is a file that comprises party-type specific data points associated with the party and processes required to completed by the party, and the party types include an individual, a trust, a corporation, a limited liability corporation (LLC), and a partnership;
in response to receiving the input, accessing a rules database to retrieve party object conversion rules applicable to the second party type;
applying the retrieved party object conversion rules to the party object to determine, from the party object conversion rules, (i) first data in the party object that is applicable to the second party type, (ii) second data in the party object that is not applicable to second party type, and (iii) third data not in the data object that is applicable to the second party type; and
in response to applying the retrieved party object conversion rules, converting the party object from the first party type to the second party type, wherein converting includes (i) retaining the first data in the party object, (ii) deleting the second data in the party object, and (iii) adding data entry fields in the data object, wherein the data entry fields are configured for entry of the third data.

10. The computer-implemented method of claim 9, wherein accessing and converting further comprise:
determining, from the party object conversion rules applicable to the second party type, at least one of (i) one or more first processes applicable to the second party that are not linked in the party object and (ii) one or more second processes that are not applicable to the second party and are linked in the party object; and
at least one of:
linking the one or more first processes to the party object; and
de-linking and deleting the one or more second processes from the party object.

11. The computer-implemented method of claim 9, wherein accessing and converting further comprise:
determining, from the party object conversion rules applicable to the second party type, (i) one or more second processes applicable to the second party that are linked in the party object and are incomplete, and (ii) a start-off point for initiation completion of each of the one or more second processes; and
configuring the party object to initiate completion of each of the one or more second processes at the start-off point.

12. The computer implemented method of claim 9, further comprising:
determining, based on the party object conversion rules applicable to the second party type and accessing a party relationship database that stores a plurality of relationships between parties, one or more parties having a relationship with the party; and
linking party objects associated with the one or more parties to the party object.

13. The computer-implemented method of 9, wherein receiving further comprises:
receiving the input that triggers initiation of conversion of the party object from a first party classification to a second party classification,
wherein accessing further comprises:
in response to receiving the input, accessing a rules database to retrieve party object conversion rules applicable to the second party classification, and
wherein converting further comprises:
in response to applying the retrieved party object rules, converting the party object from the first party classification to the second party classification.

14. A computer program product comprising:
a non-transitory computer-readable medium comprising:
a first set of codes for causing a computer to receive an input that triggers initiation of conversion of a party object from a first party type to a second party type from amongst a plurality of party types, wherein the party object is a file that comprises party-type specific data points associated with the party and processes required to completed by the party, and the party types include an individual, a trust, a corporation, a limited liability corporation (LLC), and a partnership;
a second set of codes for causing a computer to, in response to receiving the input, access the rules database to retrieve party object conversion rules applicable to the second party type;
a third set of rules for causing a computer to apply the retrieved party object conversion rules to the party object to determine, from the party object conversion rules, (i) first data in the party object that is applicable to the second party type, (ii) second data in the party object that is not applicable to second party type, and (iii) third data not in the data object that is applicable to the second party type; and
a fourth set of codes for causing a computer to, in response to applying the retrieved party object conversion rules, convert the party object from the first party type to the second party type, wherein converting includes (i) retaining the first data in the party object, (ii) deleting the second data in the party object, and (iii) adding data entry fields in the data object, wherein the data entry fields are configured for entry of the third data.

15. The computer program product of claim 14, wherein the third set of codes is further configured to cause the computer to:
determine, from the party object conversion rules applicable to the second party type, at least one of (i) one or more first processes applicable to the second party that are not linked in the party object and (ii) one or more second processes that are not applicable to the second party and are linked in the party object; and at least one of (i) link the one or more first processes to the party object, and (ii) de-link and delete the one or more second processes from the party object.

\* \* \* \* \*